Figure 1:
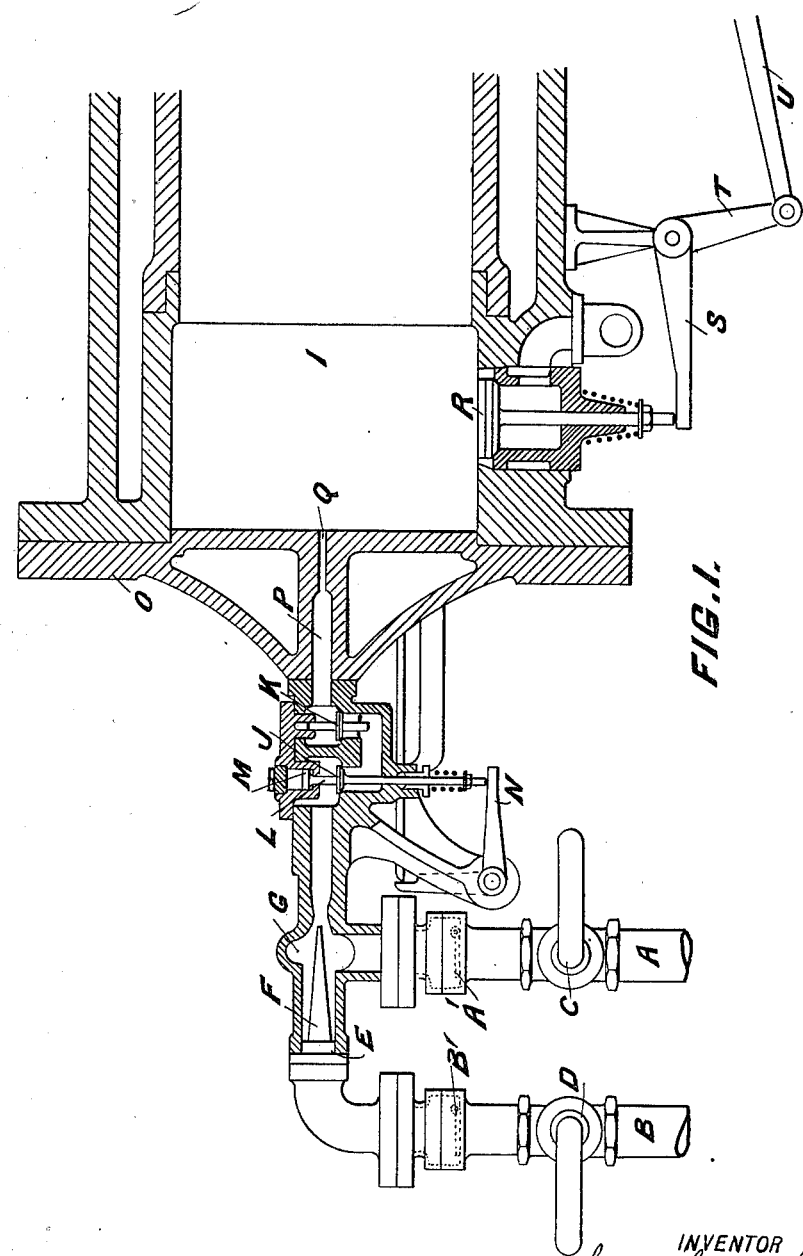

No. 672,508. Patented Apr. 23, 1901.
G. H. LLOYD.
MEANS FOR PREVENTING BACK FIRING IN INTERNAL COMBUSTION ENGINES.
(Application filed Mar. 3, 1899.)
(No Model.) 4 Sheets—Sheet 1.

No. 672,508. Patented Apr. 23, 1901.
G. H. LLOYD.
MEANS FOR PREVENTING BACK FIRING IN INTERNAL COMBUSTION ENGINES.
(Application filed Mar. 3, 1899.)
(No Model.) 4 Sheets—Sheet 2.

No. 672,508. Patented Apr. 23, 1901.
G. H. LLOYD.
MEANS FOR PREVENTING BACK FIRING IN INTERNAL COMBUSTION ENGINES.
(Application filed Mar. 3, 1899.)
(No Model.) 4 Sheets—Sheet 4.

WITNESSES:

INVENTOR
George Herbert Lloyd
BY
Richardson
ATTORNEYS

UNITED STATES PATENT OFFICE.

GEORGE HERBERT LLOYD, OF SUTTON COLDFIELD, ENGLAND.

MEANS FOR PREVENTING BACK FIRING IN INTERNAL-COMBUSTION ENGINES.

SPECIFICATION forming part of Letters Patent No. 672,508, dated April 23, 1901.

Application filed March 3, 1899. Serial No. 707,643. (No model.)

*To all whom it may concern:*

Be it known that I, GEORGE HERBERT LLOYD, manufacturer, a subject of the Queen of Great Britain and Ireland, and a resident of Coleshill Lodge, Sutton Coldfield, in the county of Warwick, England, have invented certain new and useful Means for Preventing Back Firing in Internal-Combustion Engines, of which the following is a specification.

My invention consists in the features and combinations of parts hereinafter described, and particularly pointed out in the claim.

The object of my invention is to solve the difficulty of reservoir explosions and so to enable the advantages of reservoir-engines to be attained in practice.

My invention consists, first, in mixing gas and air or inflammable vapor and air supplied from separate reservoirs by means of an injector device at or near the position of admission to the cylinder, so as to delay the formation of explosive mixture until it is just wanted, and, second, in admitting the combustible mixture to the cylinder through a narrow passage or succession or group of passages cooled by water, through which the charge enters the motor-cylinder in a cooled stream in which the velocity of the entering gases forward is greater than the velocity of the explosion backward. By these two devices I am enabled to construct a gas or combustion engine having the advantages of cycle to be obtained from the use of a reservoir.

My invention may be applied to gas or vapor explosion engines or to gas or vapor combustion engines.

In gas-explosion engines in general use, such as the "Otto" engine, gas and air are drawn into the motor-cylinder, compressed, fired, and the products of explosion driven out by four separate operations, and an explosion can only be obtained, at most, once in two revolutions. By my invention I keep gas and air separately stored up in reservoirs, the one at a higher pressure than the other. Both are led to an injector, where the higher pressure induces the lower pressure on the well-known injector system. The compressed charge is admitted to the cylinder in a compressed state, a valve shuts it in, and it is exploded. It is obvious that in such an engine an explosion could be obtained at every revolution, or, indeed, at every stroke.

Gas-combustion engines are engines in which the motor-cylinder receives its working fluid in the state of flame at a pressure equal to or less, but not greater, than the pressure of compression and in which, consequently, the power is developed by increase of volume in the working fluid. Such engines have not been commercially successful, and a great difficulty experienced is due to back explosions from the cylinder to the reservoirs. Devices, such as gratings, have been proposed to overcome this difficulty; but they have not proved successful. By my invention I keep the gas and air stored up in reservoirs separately, and they are led to an injector, where the higher-pressure fluid induces the lower-pressure fluid by the well-known injector action, and the compressed combustible mixture is there led by preference, first, through a valve actuated by the engine and, secondly, through an automatic-action back-pressure valve, then through a water-cooled thin passage into the motor-cylinder, where ignition takes place, and combustion is effected close to the point of ignition. Back explosions cannot take place when the explosive mixture is turned off, because on the engine-moved valve being closed a perceptible interval of time takes place between the closing of the valve and the explosion or burning creeping back to it through the thin water-cooled passage or passages. While explosive or combustible mixture is being forced into the motor-cylinder back explosion cannot take place, because the velocity of the compressed mixture forward is greater than the velocity of the explosion or burning backward through the thin water-cooled stream of compressed combustible fluid. In some cases, besides the main inlet-valve being actuated by the engine or the engine and governor, the gas or air admission valve to the injector may be so actuated to cut off gas or air before the main inlet-valve is closed, and so the mixture between the injector and the cylinder is either weakened or entirely displaced with air and combustion in the passages entirely prevented. Such valve may also control the supply of gases to the engine generally. In all these cases if by any accident back explosion should take place no harm need be occasioned, as the injector and passages are made strong enough to take the explosion, and after passing backward to the injector the explosion or combustion must die out, as the gas-pipe is separated from the air-pipe.

The four sheets of drawings accompanying illustrate a combustion-engine constructed in accordance with the invention operating by an impulse at every revolution.

Figure 2:
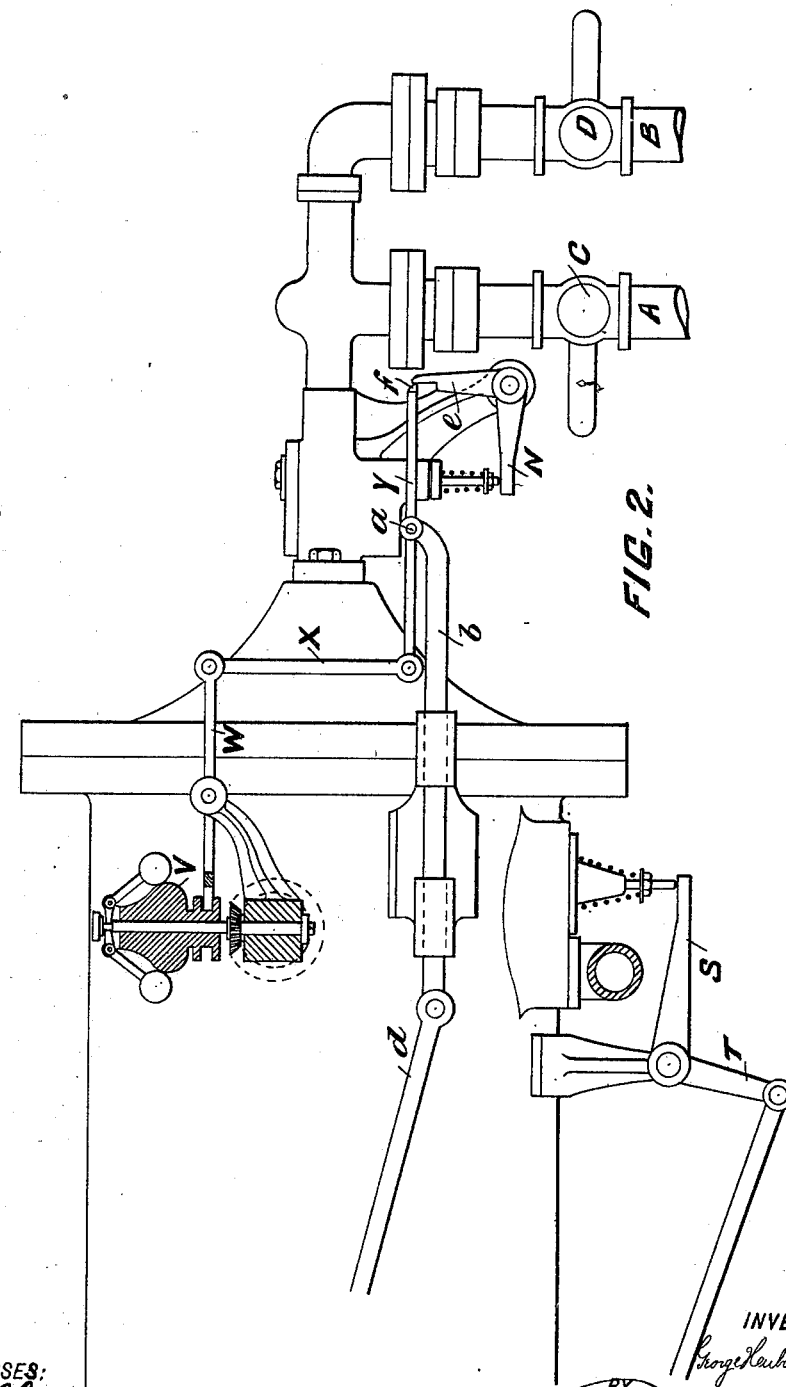
Figure 3:
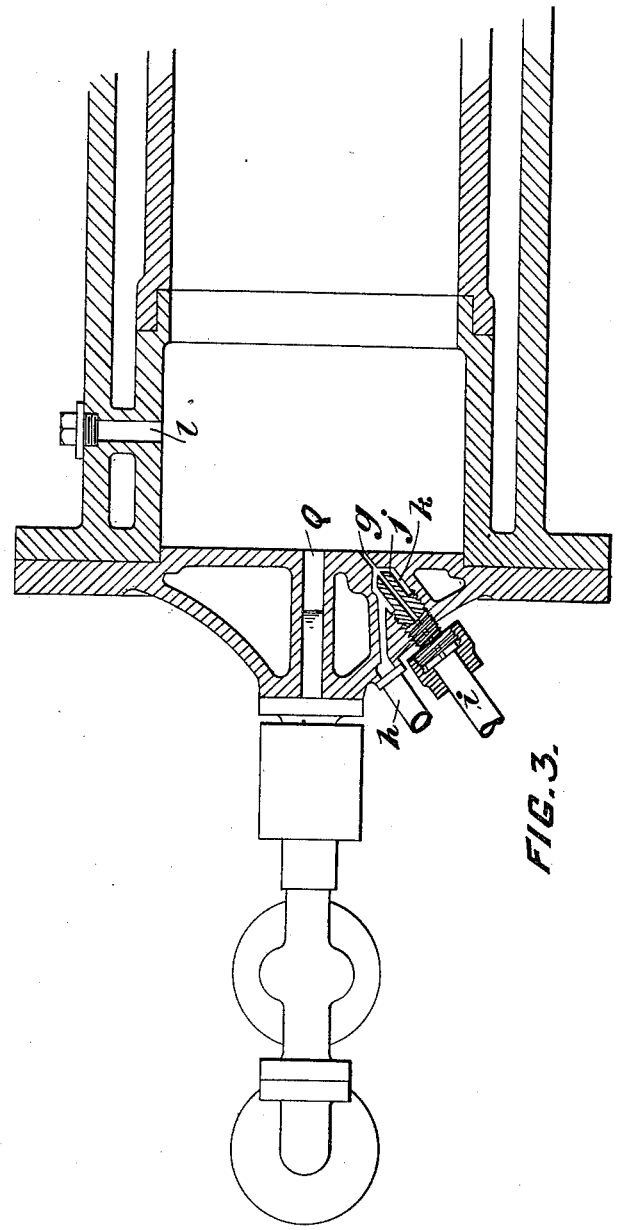
Figure 4:
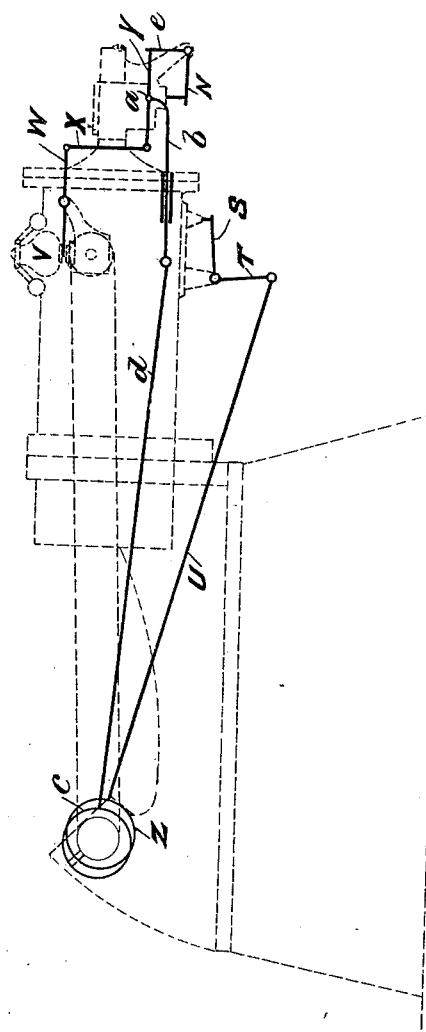

Figure 1 is a part-sectional elevation through the end of the cylinder, showing the injector mechanism and the exhaust-valve. Fig. 2 is a part side elevation of the end of the cylinder, showing the governing-gear and mechanism for operating the valves cutting off the injector from the cylinder. Fig. 3 is a part-sectional plan through the end of the cylinder, illustrating one ignition device which may be employed. Fig. 4 is a diagrammatic view showing eccentrics operating the valve mechanism.

Gas is compressed into a reservoir up to a pressure of, say, one hundred pounds per square inch. This reservoir connects to the pipe A. Air is also compressed into a second reservoir to a pressure, say, of one hundred and fifty pounds per square inch, and this reservoir communicates with a pipe B. The pipes A and B are controlled by valves or cocks, as C D, and non-return valves A' B', which are shown in dotted lines. The injector E consists of inner cone F, projecting within an outer sleeve, which sleeve has an annulus or channel G, through which gas passes. The two valves J and K are contained in a valve-box between the injector E and the cylinder I. The valve J is kept closed by the pressure of gases from the injector side, and the valve K prevents pressure from the cylinder forcing gases back toward the injector, but opens freely toward the cylinder. The valve J has a stem L and a dash-pot M. It is held to its seat by a suitable spring. It is operated by the lever N and eccentric and governing gear to be hereinafter particularly described. A passage P is provided, arranged preferably in the center of the cylinder-cover O. It narrows toward the cylinder into a flat narrow slot Q. The whole passage is effectively water-jacketed, as shown. The exhaust-valve R is operated from the levers S and T by the eccentric-rod U, and the eccentric is set to open and close the said valve at the proper times. The mechanism employed in this case to operate the valve J, controlling the admission of mixture, acts as follows: The slide $b$ is reciprocated by an eccentric $c$ and rod $d$, and $b$ carries a lever Y, pivoted to it at $a$. A link X connects Y to a lever W, operated by the governor V. The lever Y at the end $f$ is formed with a projecting knife-edge, which impinges on the arm $e$ of the bell-crank lever N. When the link X is swung by the reciprocations of the slide $b$, the vertical position of the knife-edge $f$ will only alter as the governor rises or falls. This alteration will give an increased or decreased lap upon the end of the lever $e$, and thus alter the duration of opening of the valve J, as the lever $e$ operates through a short way shaft the lever N. When the speed rises above a certain point, the knife-edge $f$ will miss the lever altogether, and thus cut out a working stroke, as no admission would then take place.

In a combustion-engine constructed as hereinbefore described one method of igniting is shown in Fig. 3 of the drawings. The jet issuing out of the slot Q is met by a transverse ignited jet from a small perforation $g$. This ignited jet is produced by connecting a pipe $h$ with the gas-reservoir and a pipe $i$ with the air-reservoir and causing the gases to meet in an injector such as that shown in the drawings, consisting of an inner adjustable nozzle $j$, conveying the air, and an annulus $k$, communicating with the gas-pipe $h$. The flame is kept constantly burning and may be lighted in the first instance through a plug-hole, such as $l$, or by an electric spark.

The operation of the engine constructed as hereinbefore described is as follows: At the beginning of the stroke the gas-valve J is lifted by the eccentric $c$, rod $d$, bar $b$, and knife-edge $f$ operating the levers $e$ and N. The mixture of gas is formed as already described and, issuing out of the slot Q, meets the transverse ignited gas-jet. Expansion then takes place. The issuing gas is then cut off by the knife-edge $f$ slipping over the end of the lever $e$, the valve immediately closing and the dash-pot M preventing noise. The valve K also drops to its seat, and as the flame begins to travel back in the slot Q it is cooled, and therefore travels slowly, so that when it reaches the valve K the said valve is already closed.

It is evident that the relative proportions of the governing-gear can be arranged to give any desired admission of gas for any fraction of the stroke, and it is also evident that the governor constructed as in Fig. 2 will automatically alter the amount of admission, according to the speed of the engine and the work performed. At or about the end of each stroke the exhaust-valve R is opened by an eccentric Z and rod U operating levers T and S.

It is to be understood that I do not limit myself to the particular form of lift valve or valves shown to cut off the mixture from the cylinder, nor to the particular construction of the governing-gear hereinbefore described with reference to Fig. 2 of the drawings. The valves C and D may also be operated from the engine-shaft after each expansion. It is also to be understood that the injector will sometimes be made with multiple jets for mixing.

My invention may be applied to an explosion-engine in the manner hereinbefore described with reference to a combustion-engine. Instead, however, of igniting the mixture as it enters the cylinder under pressure the whole volume intended for one explosion is admitted to the cylinder during the early part of the stroke, and then the valve J is closed and explosion takes place. As the water-cooled stream and the mixing-injector operate exactly as with the combustion-engine already described, it is unnecessary to refer to separate drawings.

Having thus described my invention, I declare that what I claim, and desire to secure by Letters Patent, is—

In combination, the cylinder, the air and gas supply pipes, a passage into which the air and gas supply pipes discharge, an injector for causing a mixture of air and gas in said passage, a narrow slot connecting the said passage with the cylinder and extending right up to the cylinder, a jacket extending about the said slot with a cooling medium therein and an automatic valve opening toward the cylinder and situated in the aforesaid passage between the injector and the narrow slot, substantially as described.

In witness whereof I have hereunto set my hand in presence of two witnesses.

GEORGE HERBERT LLOYD.

Witnesses:
EDWARD MARKS,
HERBERT BOWKETT.